United States Patent [19]

Fyfe

[11] Patent Number: 4,903,820
[45] Date of Patent: Feb. 27, 1990

[54] IDLER ROLLERS FOR BELT CONVEYORS

[76] Inventor: Edward R. Fyfe, 1341 Ocean Ave., Del Mar, Calif. 92014

[21] Appl. No.: 265,513

[22] Filed: Nov. 1, 1988

Related U.S. Application Data

[63] Continuation-in-part of Ser. No. 133,266, Dec. 5, 1987, Pat. No. 4,830,179, which is a continuation of Ser. No. 869,909, Jun. 3, 1986, abandoned.

[51] Int. Cl.$^4$ .............................................. B65G 39/00
[52] U.S. Cl. .................................... 198/501; 198/825; 198/829; 198/843; 198/952
[58] Field of Search ............... 198/825, 829, 842, 843, 198/501, 952; 193/37; 29/110, 129; 16/45, 46, 97, 98, 102; 384/317, 320, 321

[56] References Cited

U.S. PATENT DOCUMENTS

| | | | |
|---|---|---|---|
| 666,164 | 1/1901 | Titus | 384/381 |
| 702,273 | 6/1902 | Acklin | 198/830 |
| 770,015 | 9/1904 | Merrill | 198/825 X |
| 858,612 | 7/1907 | Mason | 198/829 |
| 1,156,386 | 10/1915 | Armstrong | 198/825 X |
| 1,255,658 | 2/1918 | Stephens | 198/830 |
| 1,371,290 | 3/1921 | Armstrong | 198/829 |
| 1,497,305 | 6/1924 | Sawhill | 198/829 |
| 2,127,643 | 8/1938 | Glossmann | 198/825 |
| 2,680,001 | 6/1954 | Batt | 384/321 X |
| 2,895,559 | 7/1959 | Smith . | |
| 3,096,874 | 7/1963 | Wooldridge . | |
| 3,149,497 | 9/1964 | Haugen | 74/241 |
| 3,193,336 | 7/1965 | Moscardini | 384/321 |
| 3,648,824 | 3/1972 | Speck | 198/501 |
| 3,809,211 | 5/1974 | Padilla | 198/825 X |
| 4,029,200 | 6/1977 | Dillon | 198/830 |
| 4,241,826 | 12/1980 | Billington | 198/825 |
| 4,266,662 | 5/1981 | Reid | 198/829 |
| 4,377,883 | 3/1983 | Folson | 16/47 |
| 4,463,840 | 8/1984 | Seynhaeve | 190/18 A |
| 4,606,659 | 8/1986 | Hogan | 384/518 |
| 4,621,728 | 11/1986 | Kain | 198/827 |
| 4,664,243 | 5/1987 | Martin | 193/37 |

FOREIGN PATENT DOCUMENTS

| | | |
|---|---|---|
| 3068216 | 9/1983 | European Pat. Off. . |
| 150634 | 8/1967 | New Zealand . |
| 54898 | 11/1942 | United Kingdom . |
| 575526 | 2/1946 | United Kingdom . |
| 649687 | 10/1949 | United Kingdom . |
| 1123813 | 3/1967 | United Kingdom . |
| 1454875 | 3/1974 | United Kingdom . |
| 2165621A | 10/1984 | United Kingdom . |

OTHER PUBLICATIONS

The Fyfe-Uhl Idler publication—published Jan. 1985, publisher Fyfe Developments.
Technical Report—Hercules 1900 Engineering Information, published Jun. 1979.

*Primary Examiner*—Robert J. Spar
*Assistant Examiner*—Cheryl L. Gastineau
*Attorney, Agent, or Firm*—Jack M. Wiseman

[57] ABSTRACT

A conveyor belt advances over an assembly of cylindrical idler rollers. Each idler roller includes a cylindrical body rotatable about an axially disposed tubular shaft. Air under pressure enters the proximal end of the tubular shaft and advances through the tubular shaft to be discharged through openings in the distal end of the tubular shaft. The air under pressure leaving the distal end of the tubular shaft advances through the space between the inner wall of the cylindrical body of the idler roller and the outer wall of the tubular shaft to be vented to atmosphere for reducing heat build-up in the idler roller.

24 Claims, 5 Drawing Sheets

FIG_8

FIG_9

FIG_10

IDLER ROLLERS FOR BELT CONVEYORS

RELATED APPLICATION

This application is a continuation-in-part of my copending application, Ser. No. 07/133,266, filed on Dec. 15, 1987 and now U.S. Pat. No. 4,830,179 for Idler Rollers For Belt Conveyors, which copending application is a continuing application of a prior complete application, Ser. No. 06/869,909, filed on June 3, 1986, now abandoned by the applicant of the present application, for Idler Rollers For Belt Conveyors.

BACKGROUND OF THE INVENTION

The present invention relates in general to belt conveyors, and more particularly to idler rollers for conveyor belts.

Conveyor belts are widely used for transporting a variety of materials, e.g. sand, gravel, from one location to another. Such conveyor belts include not only flat bed conveyor belts, but also conveyor belts having a troughed configuration for improved retention of transported material. Conveyor belts typically run on a system of idler rollers with rotational power provided by a prime mover. Since the idler rollers associated with such conveyor belts experience considerable use, attention has been given to improving their reliability.

Idler rollers used with conveyor belts are typically exposed not only to continuous friction due to motion of the conveyor belt, but also to a wide variety of foreign matter. The foreign matter frequently presents serious wear problems to the moving surfaces associated with the idler rollers. Such foreign matter originates from a wide variety of sources and frequently originates from materials carried by the conveyor belt, e.g., sand, gravel, et cetera. Such materials have the potential of not only reducing the effect of lubricants employed to neutralize friction in idler roller assemblies, but also may cut and abrade associated bearing surfaces. As a result of such abrasive action, idler rollers are frequently replaced.

In addition to the foregoing, uneven distribution of load material on the conveyor belt may result in relative movement of an idler roller. Such relative movement not only acts to introduce additional wear on load bearing surfaces, but also causes axial displacement of the idler roller relative to the support shaft about which rotation occurs. This frequently not only disturbs the operation of the conveyor belt, but further impacts other related processes which rely on an uninterrupted operation of the conveyor belt.

Additionally, idler rollers used with conveyor belts are continuously exposed to friction resulting in a heat build-up. Heat build-up within the idler rollers presents serious heat wear problems to the idler rollers. Heat build-up not only reduces the effect of lubricants employed to neutralize friction in idler roller assemblies, but also may cause excessive wear and tear on the idler rollers. As a result of heat wear problems, idler rollers are frequently replaced.

The U.S. Pat. No. 666,164 to Titus, issued on Jan. 15, 1901, for Roller Mechanism For Conveyor Belts, discloses a pair of inclined laterally-extended tubular rollers, held in position at a lower end by a circumferential rib and an associated collar, and at an upper end by a shoulder and associated shoulder cap. Lubrication may be introduced into the assembly through an associated funnel arrangement. The rollers are supported by a tubular shaft. At the distal end of the tubular shaft is the lubricant inlet opening.

The U.S. Pat. No. 858,612 to Mason, issued on July 2, 1907, for Rollers For Belt Conveyors, discloses the use of lateral-extended tubular rollers, inclined or projected in a direction transverse to the direction of travel of the conveyor belt to form a trough roller assembly.

The U.S. Pat. No. 3,648,824 to Speck, issued on March 14, 1972, for Idler Roller Device For Troughed Conveyor Belts, discloses an arrangement for the reduction of friction through the use of a smooth bearing surface of a metal construction engaging a urethane surface. The patent to Speck further discloses an axial thrust bearing, e.g., a spherical ball bearing, disposed between an upper end of a roller and a support shaft. A pair of idler rollers are mounted on an upwardly and rearwardly inclined support shaft to exert a downward thrust to maintain the rollers on the support shaft.

The U.S. Pat. No. 4,266,662 to Reid, issued on May 12, 1981, for Trough Roller Assembly, discloses a radially projecting shoulder at the distal end of a support shaft, and an interfitting groove to prevent axial movement of the idler roller with respect to the support shaft.

In the U.S. Pat. No. 1,371,290, to Armstrong granted on Mar. 15, 1921, for Belt Supporting Pulley System, there is disclosed an idler pulley for supporting a conveyor belt. The pulley has a tubular shaft. A lubricant is fed into the tubular shaft. Radial openings in the tubular shaft enable the discharge of the lubricant to the bearing surface of the pulley.

In the U.S. Pat. No. 1,255,658, to Stephens issued on Feb. 5, 1918, for Carrier For Belt Conveyers, there is disclosed a belt conveyor having a roller. The roller is supported by a hollow shaft through a hub. Grease is fed into the distal end of the tubular shaft. Radial openings are provided in the tubular shaft to enable grease to be applied to the bearing surface of the hub.

The British publication by Schmidt, No. 1,454,875, published on Nov. 3, 1976, by the British Patent Office, entitled Improvements In Or Relating To Furnace Conveyor Rolls, there is disclosed a cooled furnace conveyor roll having a hollow roll body and a stub axle. A gaseous coolant is introduced through the stub axle into the cavity between the roll body and the internal body, and is exhausted through the internal body via holes in the casing of the internal body. Cooling is affected by pumping air as a coolant through the cavity between the roll body and the internal body. The air is extracted through the internal body via passages in the casing of the inner body. The air is employed for cooling the roll body.

Heretofore external keeper seals were employed in conjunction with idler rollers disposed for supporting conveyor belts having a troughed configuration. The purpose of the external keeper seals was to inhibit the penetration of moisture and dirt in the area between the shaft and the axial opening of the idler roller. Idler rollers were heretofore employed for supporting conveyor belts which comprised a solid shaft having openings for reducing the build-up of heat. It was found that such an arrangement was not effective for reducing heat build-up in idler rollers, but rather the idler rollers were heating excessively on faster speed belts. As a consequence thereof, the idler rollers were becoming worn rather quickly.

SUMMARY OF THE INVENTION

A conveyor belt advances over an assembly of cylindrical idler rollers. Each idler roller comprises a cylindrical body rotatable about an axially disposed tubular shaft. To prevent the cylindrical bodies from being axially displaced along the respective tubular shafts, internal keeper seals are employed. Each internal keeper seal also inhibits the penetration of moisture and dirt between the internal bearing surface of a cylindrical body and the tubular shaft about which it rotates.

A suitable coolant, such as air, enters the proximal end of the tubular shaft and advances through the tubular shaft to be discharged through the distal end of the tubular shaft. The coolant leaving the distal end of the tubular shaft advances through the space between the inner wall of the cylindrical body of the idler roller and the outer wall of the tubular shaft of the idler roller to be vented to atmosphere for reducing heat build-up in the idler roller.

A feature of the present invention is that the cylindrical body of an idler roller is not displaced axially relative to the tubular shaft about which it rotates through a keeper seal. Additionally, the keeper seal inhibits the penetration of foreign matter between the wall of the axial opening of the cylindrical body and the tubular shaft about which the cylindrical body rotates, while permitting a coolant to enter at one end of the tubular shaft and to discharge through the other end of a tubular shaft for venting to atmosphere, thereby reducing heat build-up in the idler roller.

The cylindrical body of a conveyor idler roller is formed with an annular groove radially disposed about an idler opening thereof at the proximal end of the idler roller to receive a radially projecting collar formed on a tubular shaft about which the cylindrical body rotates to prevent displacement of the cylindrical body in the axial direction along the tubular shaft and to provide a seal to inhibit the penetration of foreign matter between the tubular shaft and the cylindrical body, while permitting a coolant to enter at one end of the tubular shaft and to discharge through the other end of the tubular shaft for passage through a space between the tubular shaft and the cylindrical body of the idler roller for venting to atmosphere, thereby reducing heat build-up in the idler roller.

The cylindrical body of a conveyor idler roller is formed with a radially disposed groove about its axial opening. The groove receives a radially disposed collar formed on a tubular shaft disposed along the axis of the cylindrical body for preventing axial displacement of the cylindrical body along the tubular shaft about which it rotates and to provide a seal between a bearing surface of the cylindrical body and the tubular shaft about which the cylindrical body rotates, while permitting a coolant to enter at one end of the tubular shaft and to discharge at the other end of the tubular shaft for passage in a space between the tubular shaft and the cylindrical body of the idler roller to be vented to atmosphere, thereby reducing heat build-up in the idler roller.

More particularly, a cylindrical body of an idler roller with a radially disposed groove is rotatable about a tubular shaft having a radially projecting collar. The groove of the cylindrical body receives the radially projecting collar of the tubular shaft to prevent axial displacement of the cylindrical body along the tubular shaft and to provide a seal for an internal bearing surface of the cylindrical body, while permitting a coolant to enter at one end of the tubular shaft and to discharge at the other end of the tubular shaft for passage in a space between the tubular shaft and the cylindrical body of the idler roller to be vented to atmosphere, thereby reducing heat build-up in the idler roller.

In another embodiment of the present invention, an idler roller comprises a cylindrical body having a radial projecting collar extending toward a shaft about which the cylindrical body rotates. The collar is received by a groove formed in the cylindrical wall of the shaft to limit axial displacement of the cylindrical body along the shaft and to provide a seal between the cylindrical body and the shaft, while permitting a coolant to enter at one end of the tubular shaft and to discharge at the other end of the tubular shaft for passage in a space between the tubular shaft and the cylindrical body of the idler roller to be vented to atmosphere, thereby reducing heat build-up in the idler roller.

DESCRIPTION OF THE PREFERRED EMBODIMENTS

Figures 1, 2, 3:
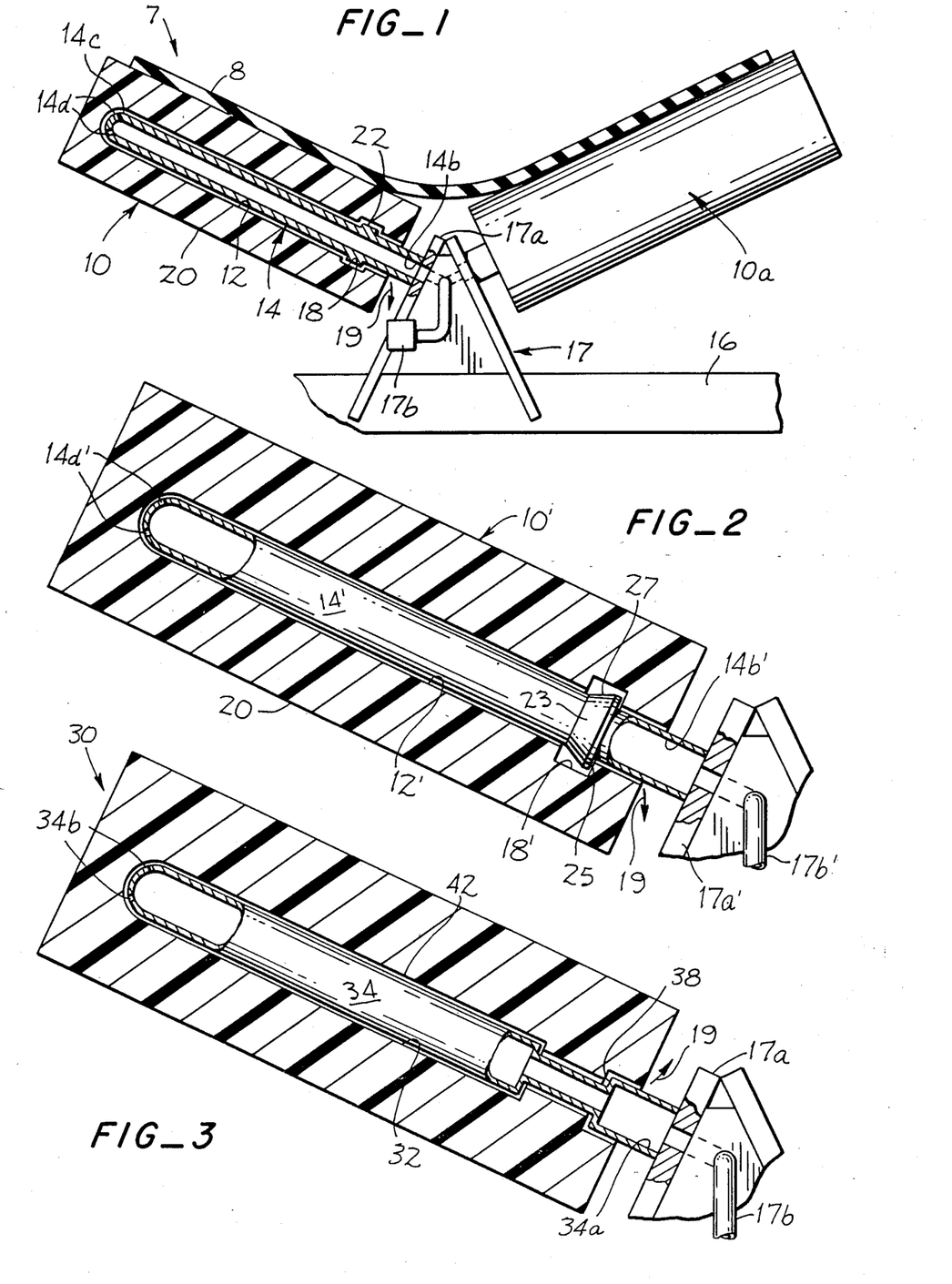
FIG. 1 is a diagrammatic transverse cross-sectional view partially in elevation of a belt conveyor taken along the axes of a pair of transversely aligned idler conveyor rollers embodying the present invention.
FIG. 2 is an enlarged diagrammatic axial cross-sectional view partially in elevation of an idler conveyor roller which is a modification of an idler conveyor roller shown in FIG. 1.
FIG. 3 is a diagrammatic axial cross-sectional view partially in elevation of another embodiment of an idler conveyor roller incorporating the present invention.

Illustrated in FIG. 1 is a belt conveyor 7 comprising a conventional conveyor belt 8. In the exemplary embodiment, the conveyor belt 8 defines transversely thereof a trough-like configuration. The conveyor belt 8, in the exemplary embodiment, is supported by and travels over a plurality of pairs of idler conveyor rollers. Only idler conveyor rollers 10 and 10a are shown in FIG. 1. The conveyor rollers 10 and 10a are similar in construction and operation. Hence, only the conveyor rollers 10 will be hereinafter described in detail.

The belt conveyor 7 is supported by a conventional and well-known frame 16 having suitable supports 17. The supports 17 are formed with outwardly and downwardly projecting members 17a having respective bores. The support members 17 are mounted on a frame 16 and the frame 16 may be a steel angle plate with connection slots.

The cylindrical idler roller 10 comprises a cylindrical body 20. In the exemplary embodiment, the cylindrical body 20 is made of suitable resilient material, such as polyurethane, rubber, or elastomeric type of material. It is contemplated that the idler rollers of the present invention can be improved by having cylindrical bodies made of chemically cross-linked material to improve thermomechanical deformation resistance; can be improved by having cylindrical bodies include silicone oil or molybdenum disulphide to reduce the coefficient of friction; and can be improved by having cylindrical bodies made of glass fiber to improve thermomechanical deformation resistance. The cross-linking agents may be Lupersol 101 and Vul-Cup-R at the 0.5% level. A peroxide may also be added. All of the additives are pre-blended into the polymer before extrusion. The cylindrical body 20 is formed with an inner axial opening 12 to receive a highly polished tubular shaft 14 and is rotatable about the tubular shaft 14. In the preferred embodiment, the tubular shaft 14 is made of steel. The tubular shaft 14 is received at one end thereof by a bore of a support member 17a. The end of the shaft 14 is preferably hemispherically shaped or convexly shaped and the confronting end of the axial opening 12 may be a conforming hemispherical shaped or concavely shaped. Other suitable optimum bearing configurations may also be employed.

Formed in the cylindrical body 20 is an annular groove or recess 18 that projects radially outwardly from the central opening 12. The groove 18 is disposed intermediate the ends of the cylindrical body 20 adjacent the proximal end of the idler roller 10. Received by the central opening 12 is the tubular shaft 14 about which the cylindrical body 20 rotates. The tubular shaft 14 is formed with an outwardly radially projecting collar 22. In the exemplary embodiment, the collar 22 has an annular configuration. It may be integrally formed with the tubular shaft 14 or it may be affixed to the tubular shaft 14 by any suitable means, including welding or the use of set screws. The cylindrical body 20 of the cylindrical idler roller 10 receives the tubular shaft 14 with the radially projecting collar 22 being disposed within the radially projecting groove 18. The collar 22 and the groove 18 serve to prevent axial displacement of the cylindrical body 20 relative to the shaft 14 about which it rotates and to provide a seal to prevent foreign matter from penetrating the central opening 12.

The surfaces of the collar 22 and the bearing surfaces of the groove 18 may be coated with a well-known low friction lubricant to reduce wear and tear. Silicon or other suitable lubricants may be applied to the walls of the axial opening 12 of the idler roller 10 which contacts the shaft 14. The lubricant increases the allowable velocity of the roller 10 at the same bearing pressure. In this instance, the internal keeper seal of the present invention will also serve as a lubricant collector.

Since the cylindrical body 20 is made of resilient material, the cylindrical body 20 may be installed on the tubular shaft 14 by temporarily spreading the shaft entrance wall of the central opening 12 and inserting the tubular shaft 14 into the central opening 12 so that the collar 22 is inserted into the groove 18. Thereupon, the resilient action of the cylindrical body 20, upon release thereof, will be restored to its initial configuration. A suitable spreader tool, not shown, may be used for this purpose.

At the proximal end of the hollow shaft 14 is closure 14a formed with a suitable openings 14b. At the distal end of the hollow shaft 14 is a closure 14c, which, in the preferred embodiment has a hemispherical or convex configuration. Formed in the closure 14c are openings 14d. In the preferred embodiment, there are two ¼ inch holes 14d in the closure 14c. Space is generally provided in the axial opening 12 between the cylindrical body 20 and the tubular shaft 14 for the rotation of the cylindrical body 12 about the tubular shaft 14.

A suitable coolant, such as air under pressure, is supplied for passage through the tubular shaft 14 from a suitable source 17b of coolant. Water or other fluids under pressure may be employed as suitable coolants. In the preferred embodiment, the coolant is air under pressure. Air flows through the opening 14b at the proximal end of the tubular shaft 14. Hence, air enters the tubular shaft 14 at the proximal end thereof and flows through the tubular shaft 14 to be discharged through the openings 14d at the distal end of the tubular shaft 14. The air discharged through the openings 14d at the distal end of the shaft 14 advances through the axial opening 12 and into the space between the cylindrical body 20 and the tubular shaft 14 toward the proximal end of the tubular shaft 14. Thereupon, the air is vented to atmosphere at the proximal end of the tubular shaft 14 at an arrow 19. As a result thereof, heat build-up in the idler roller 10 is reduced.

Figure 11:
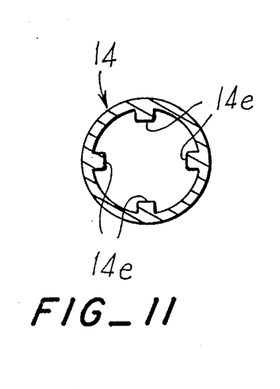
FIG. 11 is a sectional view taken along lines 11—11 of FIG. 1 to illustrate vanes along the inner wall of the tubular shaft.
Figure 12:
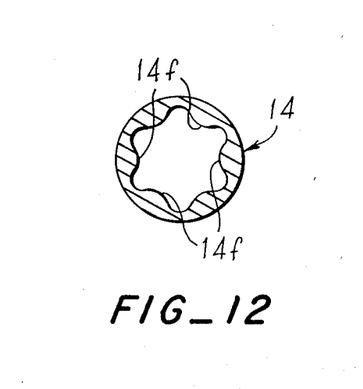
FIG. 12 is a sectional view taken along lines 11—11 of FIG. 1 to illustrate a modification of the vanes along the inner wall of the tubular shaft.

As shown in FIG. 11, vanes 14e along the inner wall of the tubular shaft 14 may enhance the reduction of heat build-up in the idler roller 10. Similarly, vanes 14f (FIG. 12) along the inner wall of the tubular shaft 14 may enhance the reduction of heat build-up in the idler roller 10. Filters, not shown, for the coolant may also serve to enhance the reduction of heat build-up in the idler roller 10.

In FIG. 2 is illustrated a roller 10' which is a modification of the roller 10. Like parts in construction and operation between the roller 10 and the roller 10' have been indicated with the same reference number having a prime suffix. In FIG. 2, a radially disposed collar 23 is used in lieu of the radially disposed collar 22. The radially disposed collar 23 comprises a flat radial wall 25 which is generally perpendicular to the axis of a tubular shaft 14', and an inclined frusto-conical wall 27 which is disposed at an acute angle relative to the axis of the tubular shaft 14'. The wall is inclined upwardly and outwardly as it progresses toward the proximal end of the idler roller 10'. The angular direction of the frusto-conical wall 27 is such as to facilitate the insertion of the radially projecting collar 23 into the groove 18′.

A suitable coolant, such as air under pressure, is supplied for passage through the tubular shaft 14′ from a suitable source 17b′ of coolant. Water or other fluids under pressure may be employed as suitable coolants. In the preferred embodiment, the coolant is air under pressure. Air flows into an opening 14b′ at the proximal end of the tubular shaft 14′. Hence, air enters the tubular shaft 14′ at the proximal end thereof and flows through the tubular shaft 14′ to be discharged through the openings 14d′ at the distal end of the tubular shaft 14′. The air discharged through the openings 14d′ at the distal end of the shaft 14′ advances through the axial opening 12′ into the space between the cylindrical body 20 and the tubular shaft 14′ toward the proximal end of the tubular shaft 14′. Thereupon, the air is vented to atmosphere at the proximal end of the tubular shaft 14′ at the arrow 19. As a result thereof, heat build-up in the idler roller 10′ is reduced.

Illustrated in FIG. 3 is an idler roller 30 for supporting a conveyor belt travelling thereover, which is another embodiment of an idler roller incorporating the present invention. The idler roller 30 may be used in lieu of the idler rollers 10 and 10′, respectively (FIGS. 1 and 2). The idler roller 30 comprises a cylindrical body 40 made of resilient material, such as polyurethane, rubber or elastomeric type material in the exemplary embodiment. Improvements heretofore mentioned for the material from which the cylindrical body 20 is made may also be embodied in the cylindrical body 40. The cylindrical body 40 is formed with a cylindrical central opening 32 along the axis of the cylindrical body 40 which receives an axially disposed tubular shaft 34. The tubular shaft 34, which is preferably made of steel, is attached to the frame 16 through the support 17 by means of the support member 17a. The axis of the cylindrical central opening 32 is coextensive with the axis of cylindrical body 40. Formed in the cylindrical body 40 is an inwardly directed radially projecting collar 38, which extends inwardly toward the axis of the cylindrical body 40 from an inner wall 42 surrounding the central opening 32. The tubular shaft 34 is formed with an annular recess or a groove 44 extending inwardly from the cylindrical wall of the tubular shaft 34. The bearing surfaces of the radially projecting collar 38 and the walls defining the groove 44 may be coated with a well-known low friction lubricant to reduce wear and tear.

Since the cylindrical body 40 is constructed from resilient material, such as polyurethane, rubber or elastomer type material in the exemplary embodiment, the cylindrical body 40 may be installed on the tubular shaft 34 by spreading the end of cylindrical body 40 through which the tubular shaft 34 is inserted and inserting the tubular shaft 34 into the central opening 32 with the radial collar 38 being disposed into the groove 44 of the tubular shaft 34. After release of the spread end of the cylindrical body 40, the resilient action of the body 40 will return to its initial shape. A suitable spreader tool, not shown, may be used to spread the central opening 32 of the cylindrical body 40.

A suitable coolant, such as air under pressure, is supplied to the tubular shaft 34 from a suitable source 17b of coolant. Water or other fluids under pressure may be employed as suitable coolants. In the preferred embodiment, the coolant is air under pressure. Air flows into an opening 34a at the proximal end of the tubular shaft 34. Hence, air enters the tubular shaft 34 at the proximal end thereof and flows through the tubular shaft 34 to be discharged through the openings 34b at the distal end of the tubular shaft 34. The air discharged through the openings 34b at the distal end of the shaft 34 advances through the axial opening 32 into the space between the cylindrical body 38 and the tubular shaft 34 toward the proximal end of the tubular shaft 34. Thereupon, the air is vented to atmosphere at the proximal end of the tubular shaft 34 at the arrow 19. As a result thereof, heat build-up in the idler roller 30 is reduced.

Figures 4, 5, 6:
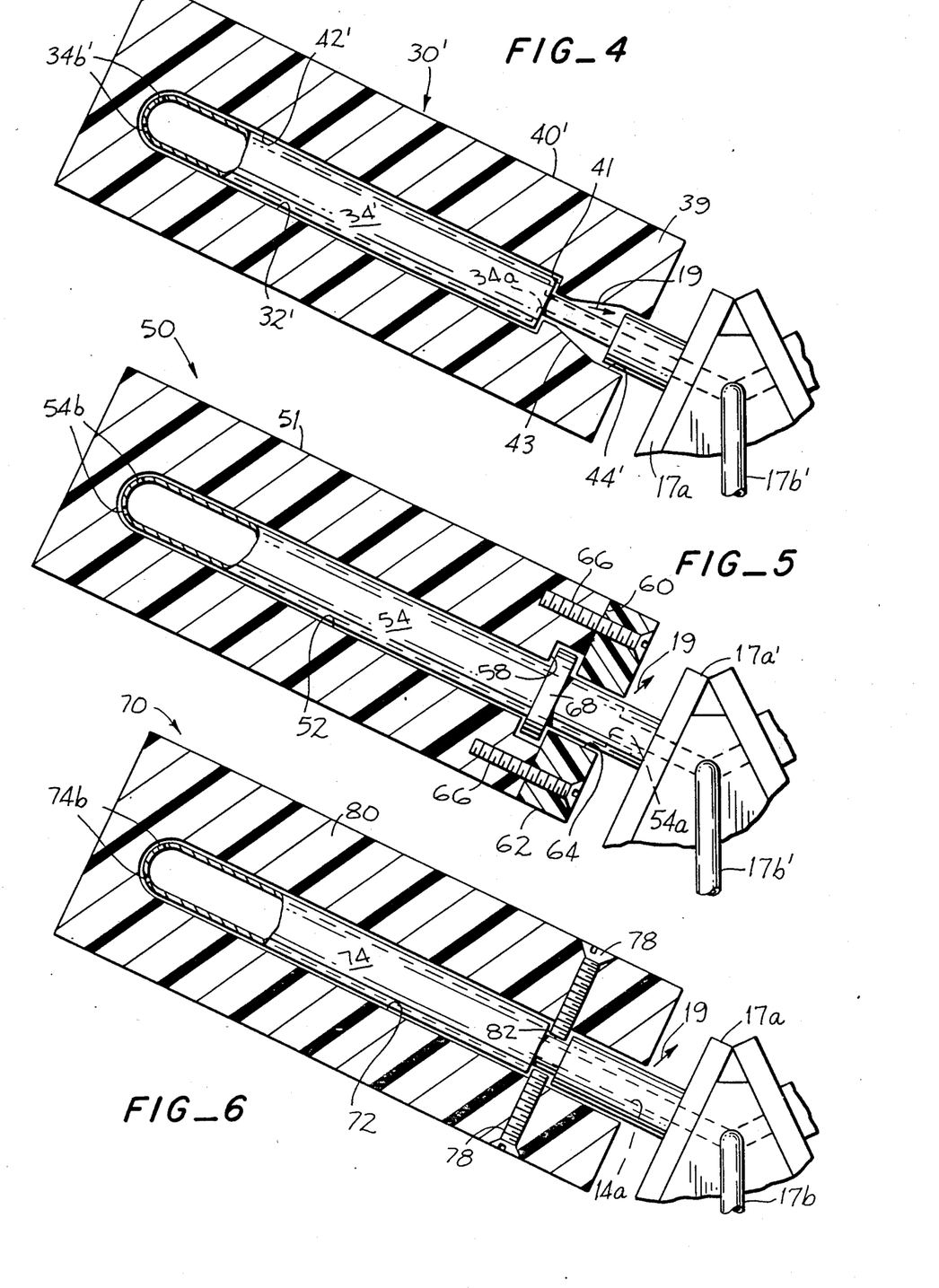
FIG. 4 is a diagrammatic axial cross-sectional view partially in elevation of an idler conveyor roller which is a modification of the idler conveyor roller shown in FIG. 3.
FIG. 5 is a diagrammatic axial cross-sectional view partially in elevation of another idler conveyor roller incorporating the present invention.
FIG. 6 is a diagrammatic axial cross-sectional view partially in elevation of another idler conveyor roller incorporating the present invention.

In FIG. 4 is illustrated a conveyor idler roller 30′ which is a modification of the idler roller 30 (FIG. 3). Like parts in construction and operation between the idler conveyor roller 30 and the idler conveyor roller 30′ are identified with the same reference number having a prime suffix. A cylindrical body 40′ is formed with an inwardly directed, radially projecting collar 39 in lieu of the collar 38 (FIG. 3) of the body 40. Referring now to FIG. 4, the radial collar 39 is formed with a radially projecting wall 41 which is generally perpendicular to the axis of the cylindrical body 40′, and a frusto-conical wall 43 which is disposed at an acute angle relative to the axis of the cylindrical body 40′. The frusto-conical wall 43 is inclined upwardly and rearwardly toward the proximal end of the idler conveyor roller 30′. The acute angle of the wall 43 facilitates the insertion of the collar into the groove 44′.

A suitable coolant, such as air under pressure, is supplied for passage through a hollow shaft 34′ from a suitable source 17b′ of coolant. Water or other fluids under pressure may be employed as suitable coolants. In the preferred embodiment, the coolant is air under pressure. Air flows into an opening 34a′ at the proximal end of the tubular shaft 34′ to be discharged through the openings 34b′ at the distal end of the tubular shaft 34′. The air discharged through the openings 34b′ at the distal end of the shaft 34′ advances through the axial opening 32′ into the space between the cylindrical body 40′ and the tubular shaft 34′ toward the proximal end of the tubular shaft 34′. Thereupon, the air is vented to atmosphere at the proximal end of the tubular shaft 34′ at the arrow 19. As a result thereof, heat build-up in the idler roller 30′ is reduced.

In FIG. 5 is illustrated a conveyor idler roller 50, which may be employed in lieu of the conveyor idler rollers 10 and 10′ (FIGS. 1 and 2). The conveyor idler roller 50 comprises a cylindrical body 51 made of a high density polyethylene or other non-elastomeric plastic materials in the exemplary embodiment. The improvements heretofore mentioned for the material from which the cylindrical body 20 is made may also be embodied in the cylindrical body 51 The cylindrical body 51 is formed with an axially disposed central opening 52 which receives a tubular shaft 54. The tubular shaft 54 is attached to the support member 17a′ of the support 17 which is mounted in the frame 16 (FIG. 1). Formed in the cylindrical body 51 is a radially extending annular groove 58. The annular groove 58 extends outwardly relative to the axis of the cylindrical body 51. The radially extending groove 58 is disposed adjacent to an end wall 60 of conveyor idler roller 50 and forms an open end therewith.

The conveyor idler roller 50 also includes an end cap 62 having a central opening 64 axially aligned with the central opening 52, which also receives the tubular shaft 54. The end cap 62 is secured to the end wall 60 of the idler roller 50 by screws 66. Formed on the tubular shaft 54 is a radially projecting collar 68. The radially projecting collar 68 may be integrally formed with the tubular shaft 54 or may be affixed to the tubular shaft 54 by suitable means, such as welding or set screws. The cylindrical central opening 52 of the cylindrical body 51 receives the tubular shaft 54 with the radially projecting collar 68 disposed within the annular recess 58. The tubular shaft 54 is inserted into the central opening 52 and the collar 68 is inserted into the groove 58 when the end cap 62 is removed from the cylindrical body 51. After the tubular shaft 54 is inserted within the inner central opening 52 and the radially projecting collar 68 is disposed within the annular groove 58, the end cap 52 is secured to the end wall 60 of the cylindrical body 51. In this manner, the tubular shaft 54 is disposed within the central opening 52 and the collar 68 is placed into the groove 58 with facility.

Figure 8:
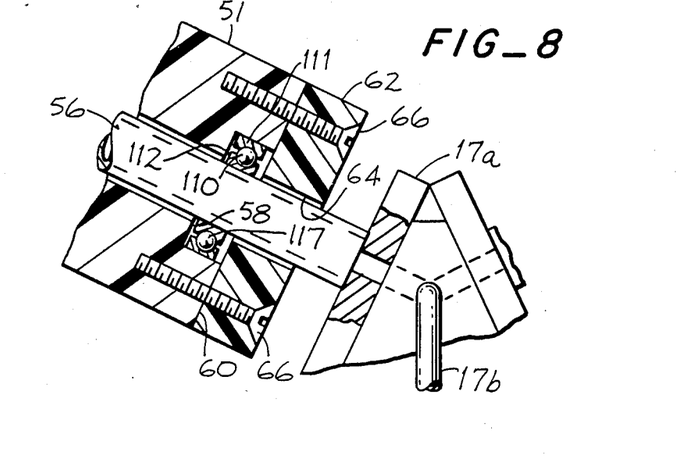
FIG. 8 is a fragmentary sectional view partially in elevation of an idler conveyor roller similar to the idler conveyor roller shown in FIG. 5 with a ball bearing being employed as a collar.
Figure 9:
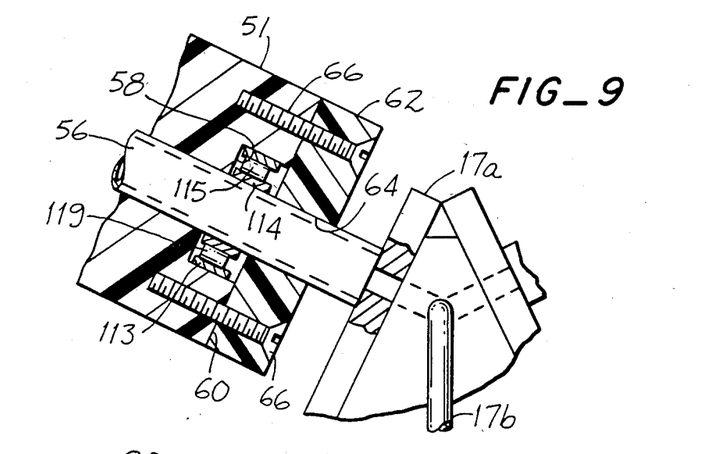
FIG. 9 is a fragmentary sectional view partially in elevation of an idler conveyor roller similar to the idler conveyor roller shown in FIG. 5 with a roller bearing being employed as a collar.

While the collar 68 is described as affixed to the tubular shaft 54, the collar 68 may be in the form of a ball bearing 110 (FIG. 8) or a roller bearing 115 (FIG. 9) to provide bearing contact between the axially directed walls surrounding the groove 58 and the tubular shaft 54. A suitable cage retains balls 117 in position and a suitable cage retains rollers 119 in position. Conventional races 111 and 112 are provided between which the balls 117 travel. Similarly, conventional races 113 and 114 are provided between which the rollers 119 travel.

The tubular shaft 54 is received by the member 17a' of the support 17 which is mounted on the frame 16. The cylindrical body 51 and the cap 62 secured thereto rotate freely about the tubular shaft 54. The radially projecting collar 68 in conjunction with the annular groove 58 serve to prevent axial displacement of the cylindrical body 51 along the tubular shaft 54 and to provide a seal to prevent foreign matter from penetrating the central opening 52. The walls of the radial collar 68 and the bearing surfaces of the walls defining the annular groove 58 may be coated with a well-known low friction lubricant to reduce wear and tear. The cap 62 of the conveyor idler roller 50 is disposed adjacent the end of the shaft 54 received by the support member 17a of the support 17 and, hence, at the proximal end of the cylindrical body 51.

A suitable coolant, such as air under pressure, is supplied for passage through the tubular shaft 54 from a suitable source 17b' of coolant. Water or other fluids under pressure may be employed as suitable coolants. In the preferred embodiment, the coolant is air under pressure. Air flows into an opening 54a at the proximal end of the tubular shaft 54. Hence, air enters the tubular shaft 54 at the proximal end thereof and flows through the tubular shaft 54 to be discharged through the openings 54b at the distal end of the tubular shaft 54. The air discharged through the openings 54b at the distal end of the shaft 54 advances through the axial opening 52 into the space between the cylindrical body 51 and the tubular shaft 54 toward the proximal end of the tubular shaft 54. Thereupon, the air is vented to atmosphere at the proximal end of the tubular shaft 54 at the arrow 19. As a result thereof, heat build-up in the idler roller is reduced.

In FIG. 6 is illustrated a conveyor idler roller 70, which may be used in lieu of the conveyor idler rollers 10 and 10', respectively. The conveyor idler roller 70 comprises a cylindrical body 80 made of high density polyethylene or other non-elastomeric plastic materials in the exemplary embodiment. The improvements heretofore mentioned for the material from which the cylindrical body 20 is made of may also be embodied in the cylindrical body 80. The cylindrical body 80 is formed with a cylindrical central opening 72 which serves to receive a tubular shaft 74. The central opening 72 is disposed along the axis of the cylindrical body 80. The tubular shaft 74 is received by the support member 17a of the support 17, which is mounted on the frame 16. A plurality of set screws 78 is radially disposed within the cylindrical body 80 and are angularly spaced apart to form an annular array of set screws. The set screws 78, when fully positioned within cylindrical body 80, project radially inward into the central opening 72 toward the axis of cylindrical body 80.

The tubular shaft 74 is formed with an annular groove 82 and is disposed in the central opening 72 of the cylindrical body 80 with the annular groove 82 receiving the distal ends of the set screws 78. The cylindrical body 80 is freely rotatable about the axis of the tubular shaft 74. With the distal ends of the set screws 78 extending into the annular groove 82, the cylindrical body 80 is prevented from axial displacement along the tubular shaft 74.

Figure 10:
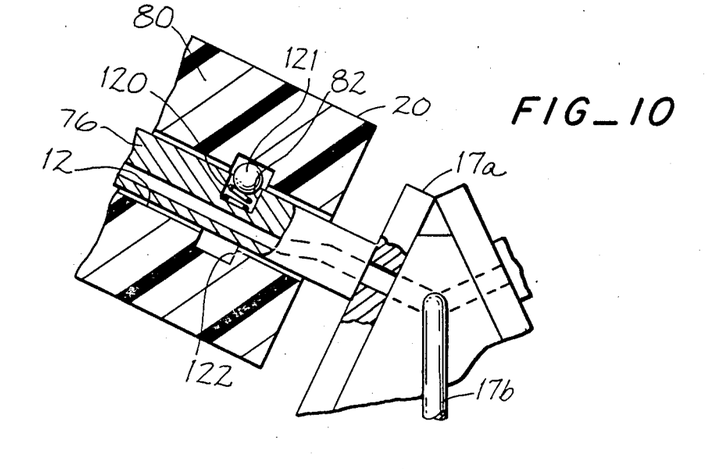
FIG. 10 is a fragmentary sectional view partially in section of an idler conveyor roller similar to the idler conveyor roller shown in FIG. 6.

In lieu of the screws 78 (FIG. 6), a spring 120 (FIG. 10) under compression is disposed in the groove 82 and a ball 121 is spring urged into an annular groove 122 formed in the cylindrical body 80. The ball 121 projects within the annular groove 82 and the annular groove 122 under the urgency of the spring 120. This arrangement lends itself for easy installation and removal of the roller 80 from the tubular shaft 74 when the roller is not operating as a conveyor element. Radial outward movement of the roller 80 enables the ball 121 to be removed from the grooves 82 and 122. When the ball 121 is so removed, the roller 80 can be removed from the tubular shaft 74. Conversely, the replacement of the ball 121 within the grooves 82 and 122 enables the roller 80 to be restrained axially while permitting rotation about the axis of the tubular shaft 74.

A suitable coolant, such as air under pressure, is supplied for passage through the tubular shaft 74 from a suitable source 17b of coolant. Water or other fluids under pressure may be employed as suitable coolants. In the preferred embodiment, the coolant is air under pressure. Air flows into an opening 74a at the proximal end of the tubular shaft 74. Hence, air enters the tubular shaft 74 at the proximal end thereof and flows through the tubular shaft 74 to be discharged through the openings 74b at the distal end of the tubular shaft 74. The air discharged through the openings 74b at the distal end of the shaft 74 advances through the axial opening 72 into the space between the cylindrical body 80 and the tubular shaft 74 toward the proximal end of the tubular shaft 74. Thereupon, the air is vented to atmosphere at the proximal end of the tubular shaft 74 at the arrow 19. As a result thereof, heat build-up in the idler roller 70 is reduced.

Figure 7:
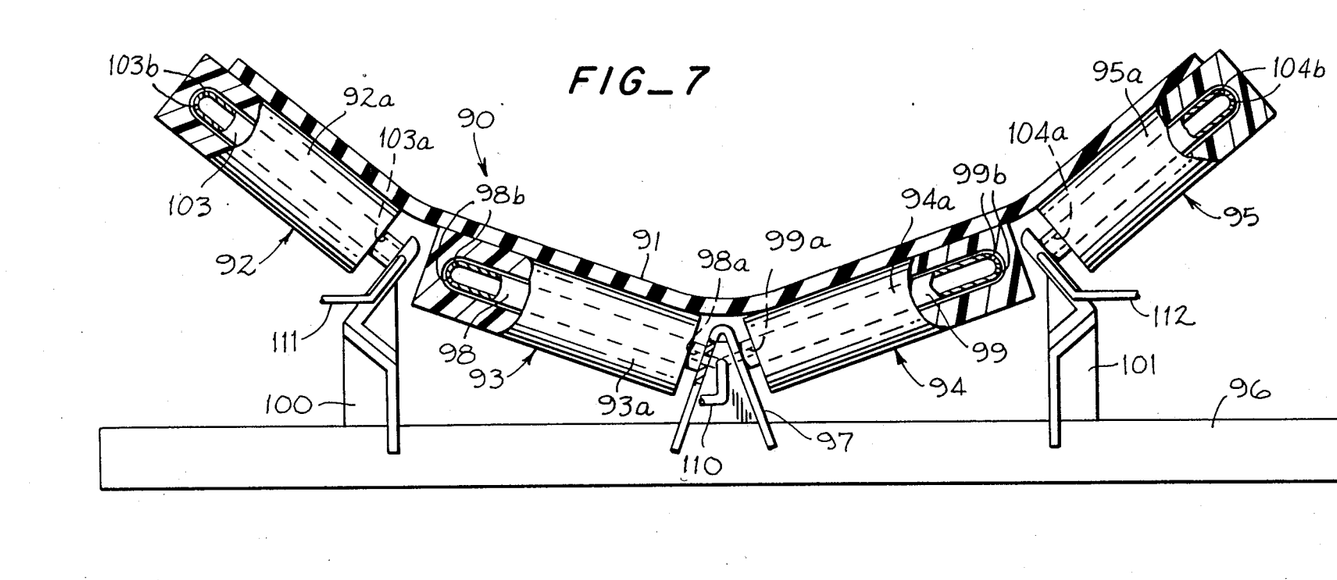
FIG. 7 is a diagrammatic transverse cross-sectional view partially in elevation of a belt conveyor taken along the axes of a plurality of transversely aligned idler conveyor rollers embodying the present invention.

Illustrated in FIG. 7 is a belt conveyor 90 comprising a conventional conveyor belt 91. The conveyor belt 91 defines transversely thereof a trough-like configuration. The conveyor belt 91 is supported by and travels over a plurality of idler conveyor rollers 92-95. The idler conveyor rollers 92-95 are similar in construction and operation. In the exemplary embodiment, the idler conveyor rollers 92-95 are similar to the idler conveyor roller 10 heretofore described in detail. It is apparent that the idler conveyor rollers 92-95 could be similar to the idler conveyor rollers shown in FIGS. 2-6.

The belt conveyor is supported by a conventional and well-known frame 96. The proximal ends of the idler conveyor rollers 93 and 94 are supported by a support 97 in a manner heretofore described. The confronting ends of tubular shafts 98 and 99 of the idler conveyor rollers 93 and 94, respectively, are threadedly secured to the outwardly and downwardly projecting members of the Y support 97 in a manner theretofore described in connection with FIG. 1.

The outboard outwardly and upwardly inclined idler conveyor rollers 92 and 95 are supported at the lower ends thereof by angular outer supports 100 and 101, respectively. The outer supports 100 and 101 are suitably mounted at opposite ends of the frame 96. The outer supports 100 and 101 respectively receive tubular shafts 103 and 104 of the idler conveyor rollers 92 and 95.

A suitable coolant, such as air under pressure, is supplied to the inner support 97 of the frame 96 from a suitable source 110 of coolant. Water or other fluids under pressure may be employed as suitable coolants. In the preferred embodiment, the coolant is air under pressure. Air flows into the inner support 110 into an opening 98a at the proximal end of the tubular shaft 98 and into an opening 99a at the proximal end of the tubular shaft 99. Hence, air enters the tubular shafts 98 and 99 at the proximal end thereof and flows through the tubular shafts 98 and 99, respectively, to be discharged through the openings 98b at the distal end of the tubular shaft 98 and to be discharged through the openings 99b at the distal end of the tubular shaft 99. The air discharged through the openings 98b at the distal end of the tubular shaft 98 advances through the axial opening into the space between the cylindrical body 98a and the tubular shaft 98 toward the proximal end of the tubular shaft 98. Similarly, the air discharged through the openings 99b at the distal end of the tubular shaft 99 advances through the axial opening into the space between the cylindrical body 94a and the tubular shaft 99 toward the proximal end of the tubular shaft 99. Thereupon, the air is vented to atmosphere at the proximal ends of the tubular shafts 98 and 99. As a result thereof, heat build-up in the idler rollers 93 and 94 is reduced.

A suitable coolant, such as air under pressure, is supplied to the outer supports 100 and 101, respectively, of the frame 96 from suitable sources 111 and 112 of coolant. Water or other fluids under pressure may be employed as suitable coolants. In the preferred embodiment, the coolant is air under pressure. Air flows into the outer support 100 into an opening 103a at the proximal end of the tubular shaft 103. Air flows into the outer support 101 into at least one opening 104a at the proximal end of the tubular shaft 104. Hence, air enters the tubular shafts 103 and 104, respectively, at the proximal ends thereof and flows through the tubular shafts 103 and 104, respectively, to be discharged through the openings 103b and 104b at the distal ends of the tubular shafts 103 and 104, respectively. The air discharged through the openings 103b at the distal end of the shaft 103 advances through the axial opening into the space between the cylindrical body 92a and the tubular shaft 103 toward the proximal end of the tubular shaft 103. The air discharged through the openings 104b at the distal end of the shaft 104 advances through the axial opening into the space between the cylindrical body 95a and the tubular shaft 104 toward the proximal end of the tubular shaft 104. Thereupon, the air is vented to atmosphere at the proximal end of the tubular shafts 103 and 104, respectively. As a result thereof, heat build-up in the idler rollers 92 and 95 is reduced.

Figure 13:
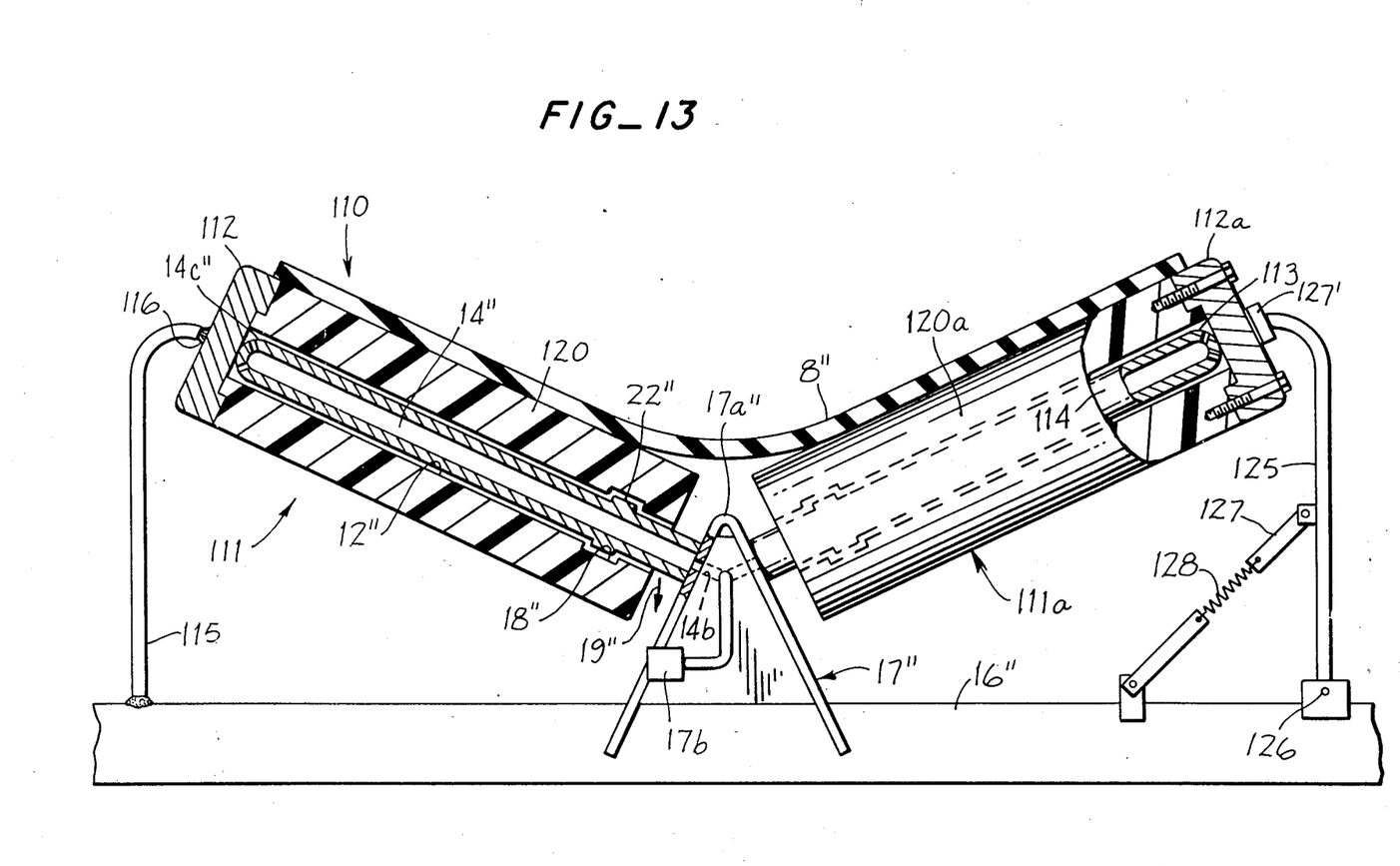
FIG. 13 is a diagrammatic transverse cross-sectional view partially in elevation of a belt conveyor taken along the axis of a pair of tranversely aligned idler conveyor rollers and particularly illustrating arrangements for grounding electrostatic electricity.

Illustrated in FIG. 13 is a belt conveyor 110 similar to the belt conveyor 7 shown in FIG. 1. Like parts in construction and operation between the rollers 10 and 10a and rollers 111 and 111a have been indicated with the same reference numerals having a double prime suffix.

The distal ends of the idler rollers 111 and 111a, respectively, are provided with electrically conductive caps 112 and 112a, which engage, respectively, the hemispherical closures 14c″ and 113 at the distal ends of the steel tubular shafts 14″ and 114. In the exemplary embodiments, the caps 112 and 112a are made of steel. Cylindrical bodies 120 and 120a of the idler rollers 111 and 112 are similar to the cylindrical bodies of the idler rollers 10 and 10a, except that the distal ends of the cylindrical bodies 120 and 120a are reduced in size in the axial direction so that the hemispherical end of the steel tubular shafts 14″ and 114 are able to make electrical contact with the steel caps 112 and 112a, respectively.

Mounted on the frame 16″ is an upright post 115 made of electrically conductive material, such as steel. The upper, free end of the post 115 is curved toward the electrically conductive cap 112. Thin wires 116 at the free end of the post 115 contacts the steel cap 112 to electrically ground the idler roller 111. Hence, any static electricity that may be present is grounded to reduce the possibility of an explosion occurring in the conveying of grain, coal or the like. In lieu of the thin wires 116, it is contemplated that any electrically conductive, low friction material may be used, such as TPFE conducting strip.

The base of the post 115 may be fixed to the frame 16″ or may be yieldably attached to the frame 16″. As shown in FIG. 13, a post 125 is yieldably attached to the frame 16″ by a suitable pivot joint 126. A spring loaded strut 127 with a compression spring 128 interconnects the post 125 and the frame 16″ to adjust the contact between an electrical contact head 127′ and the electrically conductive cap 112a. The strut 127 at one end thereof is pivotally connected to the frame 16″ and at the other end thereof is pivotally connected to the post 125. An electrically conductive strip, such as TPFE, may be attached to the contact head 127 to contact the electrically conductive cap 112a.

It presently appears that the preferred embodiment for the material to be employed for the cylindrical body of the cylindrical idler roller is made of the following ingredients:

| Ingredient | By Weight |
| --- | --- |
| ultra high molecular weight polyethylene | 100% |
| molybdenum disulphide or silicone oil | .5% |
| cross linking agents | .2% | carbon or other ingredient for color and ultra violet protection.

Glass fiber is not an ingredient presently, but may be added in the future. The estimated weight by percentage for the glass fiber may be 0.5%.

What is claimed is:

1. A conveyor idler roller for a belt conveyor comprising:

(a) a cylindrical body over which said belt conveyor advances formed with a central opening along the axis thereof, said central opening having an open end;

(b) a tubular shaft insertable into said central opening through the open end thereof and disposed within said central opening with the axis thereof coextensive with the axis of said cylindrical body, said cylindrical body being freely rotatable about the axis of said tubular shaft for the advancement of said belt conveyor thereover, said tubular shaft having a proximal end and a distal end with an opening at said proximal end and with an opening at said distal end, (c) said cylindrical body and said tubular shaft cooperating to form means therebetween disposed in the vicinity of the open end of said central opening for preventing axial displacement of said cylindrical body along said tubular shaft while permitting said cylindrical body to rotate freely about the axis of said tubular shaft and for inhibiting the penetration of foreign matter in said central opening of said cylindrical body; and (d) a source of coolant communicating with the opening at the proximal end of said tubular shaft, said coolant advancing through said tubular shaft and discharging through said opening in the distal end of said tubular shaft, said coolant advancing through a space between said cylindrical body and said tubular shaft to be vented to atmosphere at said proximal end of said tubular shaft for reducing heat build-up in said idler roller.

2. A conveyor idler roller as claimed in claim 1 wherein said means comprises a radially extending groove formed in said cylindrical body and extending from said central opening, said means further comprises a radially projecting collar on said tubular shaft extending from said tubular shaft, said collar being disposed in said groove to prevent the axial displacement of said cylindrical body along said tubular shaft while permitting said cylindrical body to rotate freely about the axis of said tubular shaft and to inhibit the penetration of foreign matter in said central opening of said cylindrical body.

3. A conveyor idler roller as claimed in claim 2 wherein said cylindrical body is made of resilient material and said collar enters said groove while said resilient material is temporarily deformed, after said collar is inserted into said groove the resilient action of said cylindrical body restores said cylindrical body to its initial shape.

4. A conveyor idler roller as claimed in claim 3 wherein said collar is formed with a wall sloping upwardly and rearwardly toward the open end of said central opening to facilitate the insertion of said collar into said groove.

5. A conveyor idler roller as claimed in claim 3 and comprising a low friction lubricant disposed between said collar and a wall defining said groove and confronting said collar.

6. A conveyor idler roller as claimed in claim 1 wherein said means comprises a radially extending groove formed in said shaft and extending inwardly from the cylindrical wall of said shaft, said means further comprises a radially projecting collar on said cylindrical body extending from said central opening, said collar being disposed in said groove to prevent the axial displacement of said cylindrical body along said shaft while permitting said cylindrical body to rotate freely about the axis of said shaft and to inhibit the penetration of foreign matter in said central opening of said cylindrical body.

7. A conveyor idler roller as claimed in claim 6 wherein said collar is made of resilient material and enters said groove while temporarily deformed, after said collar is inserted into said groove the resilient action of said collar restores said collar to its initial shape.

8. A conveyor idler roller as claimed in claim 7 wherein said collar is formed with a wall sloping upwardly and rearwardly toward the open end of said central opening to facilitate the insertion of said collar into said groove.

9. A conveyor idler roller as claimed in claim 6 and comprising a low friction lubricant disposed between said collar and a wall defining said groove and confronting said collar.

10. A conveyor idler roller for a belt conveyor comprising:

(a) a cylindrical body formed with a central opening, said central opening having an open end at one end of said cylindrical body;

(b) a tubular shaft insertable into said central opening through the open end of said central opening at said one end of said cylindrical body and disposed within said central opening coaxially with the axis of said cylindrical body, said cylindrical body being rotatable freely about the axis of said tubular shaft, said tubular shaft having a proximal end and a distal end with an opening at said proximal end and with an opening at said distal end, (c) said cylindrical body and said tubular shaft cooperating to form means therebetween disposed adjacent said one end of said cylindrical body for preventing axial displacement of said cylindrical body along said tubular shaft while permitting said cylindrical body to rotate freely about the axis of said tubular shaft and for inhibiting the penetration of foreign matter in said central opening of said cylindrical body;

(d) a cap secured to said one end of said cylindrical body, said cap having a central opening to receive the proximal end of said shaft; and (e) a source of coolant communicating with the opening at the proximal end of said tubular shaft, said coolant advancing through said tubular shaft and discharging through the opening in the distal end of said tubular shaft, said coolant advancing in a space between said cylindrical body and said tubular shaft to be vented to atmosphere at said proximal end of said tubular shaft for reducing heat build-up in said idler roller.

11. A conveyor idler roller as claimed in claim 10 wherein said means comprises a radially extending groove formed in said cylindrical body and extending from said central opening, said means further comprises a radially projecting collar on said tubular shaft extending from said tubular shaft, said collar being disposed in said groove to prevent the axial displacement of said cylindrical body along said tubular shaft while permitting said cylindrical body to rotate freely about the axis of said shaft and to inhibit the penetration of foreign matter in said central opening of said cylindrical body.

12. A conveyor idler roller as claimed in claim 11 and comprising a low friction lubricant disposed between said collar and a wall defining said groove and confronting said collar.

13. A conveyor idler roller for a belt conveyor comprising:
(a) a cylindrical body formed with a central opening along the axis thereof;
(b) a tubular shaft disposed within said central opening with the axis thereof coextensive with the axis of said cylindrical body, said cylindrical body being rotatable freely about the axis of said tubular shaft, said tubular shaft being formed with a radially extending groove extending inwardly from the cylindrical wall of said tubular shaft, said tubular shaft having a proximal end and a distal end with an opening at said proximal end and with an opening at said distal end;
(c) a plurality of angularly spaced screws extending radially from the exterior wall of said cylindrical body into said central opening and into said groove to prevent axial displacement of said cylindrical body along said tubular shaft while permitting said cylindrical body to rotate freely about the axis of said tubular shaft; and
(d) a source of coolant communicating with the opening at the proximal end of said tubular shaft, said coolant advancing through said tubular shaft and discharging through said opening in the distal end of said tubular shaft, said coolant advancing in a space between said cylindrical body and said tubular shaft to be vented to atmosphere at the proximal end of said tubular shaft for reducing heat build-up in said idler roller.

14. A conveyor idler roller according to claim 1 wherein the distal end of said tubular shaft inserted into said central opening is disposed adjacent a closed end of said central opening, and wherein said distal end of said tubular shaft has a hemispherical configuration, said opening being disposed at the distal end of said tubular shaft.

15. A conveyor idler roller according to claim 3 and comprising a lubricant disposed between said shaft and a wall surrounding said central opening, and wherein said collar and a wall defining said groove and confronting said collar collects lubricant from the space between said tubular shaft and said wall surrounding said central opening.

16. A conveyor idler roller as claimed in claim 11 wherein said collar is in the form of a ball bearing.

17. A conveyor idler roller as claimed in claim 1 wherein said means comprises a radially extending annular groove formed in said cylindrical body and extending from said central opening, a radially projecting annular groove formed in said tubular shaft and extending inwardly from the cylindrical wall of said tubular shaft, a spring disposed in said groove formed in said shaft, and a ball disposed in said groove formed in said shaft and said groove formed in said cylindrical body and retained in said grooves of said shaft and said cylindrical body under the urgency of said spring for preventing the axial displacement of said cylindrical body along said tubular shaft while permitting said cylindrical body to rotate freely about the axis of said tubular shaft and to inhibit the penetration of foreign matter in said central opening of said cylindrical body.

18. A conveyor idler roller as claimed in claim 1 wherein said coolant is air.

19. A conveyor idler roller as claimed in claim 14 wherein said coolant is air.

20. A conveyor idler roller for a belt conveyor comprising:
(a) a cylindrical body over which said belt conveyor advances formed with a central opening along the axis thereof, said central opening having an open end:
(b) a tubular shaft disposed in said central opening through the open end thereof and disposed within said central opening with the axis thereof coextensive with the axis of said cylindrical body, said cylindrical body being freely rotatable about the axis of said tubular shaft for the advancement of said belt conveyor thereover, said tubular shaft having a proximal end and a distal end with an opening at said proximal end and with an opening at said distal end; and
(c) a source of coolant communicating with the opening at said proximal end of said tubular shaft, said coolant advancing through said tubular shaft and discharging through said opening in the distal end of said tubular shaft, said coolant advancing through a space between said cylindrical body and said tubular shaft to be vented to atmosphere at the said proximal end of said tubular shaft for reducing heat build-up in said idler roller.

21. A conveyor idler roller as claimed in claim 20 wherein said coolant is in the form of air.

22. A conveyor idler roller as claimed in claim 20 wherein said tubular shaft has a hemispherical configuration at its distal end and said opening is disposed at the distal end of said tubular shaft.

23. A conveyor idler roller as claimed in claim 21 wherein said tubular shaft is made of electrically conductive material, said idler roller comprising an electrically conductive cap disposed on said cylindrical body at the distal end thereof in contact with said tubular shaft, and electrically conductive means contacting said electrically conductive cap for discharging electrostatic charge accumulating on said idler roller.

24. A conveyor idler roller as claimed in claim 14 wherein said tubular shaft is made of electrically conductive material, said idler roller comprising an electrically conductive cap disposed on said cylindrical body at the distal end thereof in contact with said tubular shaft, and electrically conductive means contacting said electrically conductive cap for discharging electrostatic charge accumulating on said idler roller.

* * * * *